United States Patent
Sakata et al.

(10) Patent No.: US 9,608,487 B2
(45) Date of Patent: Mar. 28, 2017

(54) ELECTRIC MOTOR AND METHOD FOR WINDING ELECTRIC MOTOR WINDING WIRE

(71) Applicant: Mitsuba Corporation, Kiryu-shi, Gunma (JP)

(72) Inventors: Kenji Sakata, Kiryu (JP); Akio Hoshino, Kiryu (JP)

(73) Assignee: Mitsuba Corporation, Kiryu-shi (JP)

(*) Notice: Subject to any disclaimer, the term of this patent is extended or adjusted under 35 U.S.C. 154(b) by 312 days.

(21) Appl. No.: 14/350,454

(22) PCT Filed: Oct. 17, 2012

(86) PCT No.: PCT/JP2012/076796
§ 371 (c)(1),
(2) Date: Apr. 8, 2014

(87) PCT Pub. No.: WO2013/058268
PCT Pub. Date: Apr. 25, 2013

(65) Prior Publication Data
US 2014/0252909 A1    Sep. 11, 2014

(30) Foreign Application Priority Data

Oct. 18, 2011 (JP) .................... 2011-228484

(51) Int. Cl.
*H02K 3/28* (2006.01)
*H02K 15/04* (2006.01)
(Continued)

(52) U.S. Cl.
CPC ............ *H02K 3/28* (2013.01); *H02K 3/12* (2013.01); *H02K 15/045* (2013.01); *H02K 23/30* (2013.01); *H02K 2213/03* (2013.01)

(58) Field of Classification Search
CPC .. H02K 15/045; H02K 2213/03; H02K 23/30; H02K 3/12; H02K 3/28
(Continued)

(56) References Cited

U.S. PATENT DOCUMENTS 5,596,236 A * 1/1997 Lee .................. A47L 9/2842
200/1 A
2006/0220489 A1* 10/2006 Osawa .................. H02K 23/28
310/198
(Continued)

FOREIGN PATENT DOCUMENTS

CN    87100200 A    7/1987
DE    102006011550 A1    9/2007
(Continued)

OTHER PUBLICATIONS

Translation of foreign document JP 2011061940 A (Year: 2011).*
(Continued)

*Primary Examiner* — Alex W Mok
(74) *Attorney, Agent, or Firm* — Wood Herron & Evans LLP

(57) ABSTRACT

A winding wire (14) includes a first coil (15) formed by being wound N/2+α times between two predetermined slots (13) present in positions which are point-symmetrical with respect to a rotating shaft, and a second coil (16) formed by being wound N/2−α times between the two predetermined slots (13) which are the same as those between which the first coil (15) is formed, when a predetermined number of turns of the winding wire (14) between the predetermined slots is N.

6 Claims, 11 Drawing Sheets

(51) Int. Cl.
*H02K 3/12* (2006.01)
*H02K 23/30* (2006.01)

(58) Field of Classification Search
USPC .......................................... 310/208; 242/433
See application file for complete search history.

(56) References Cited

U.S. PATENT DOCUMENTS

| | | | |
|---|---|---|---|
| 2007/0024151 A1* | 2/2007 | Du | H02K 1/148 310/254.1 |
| 2007/0188040 A1* | 8/2007 | Kawashima | H02K 23/34 310/225 |
| 2010/0090558 A1* | 4/2010 | Suzuki | H02K 15/0471 310/208 |
| 2011/0210641 A1* | 9/2011 | Chiba | H02K 3/28 310/208 |
| 2011/0241472 A1* | 10/2011 | Tanaka | H02K 3/28 310/208 |

FOREIGN PATENT DOCUMENTS

| | | |
|---|---|---|
| EP | 2302769 A1 | 3/2011 |
| JP | 07-034630 B | 4/1995 |
| JP | 08289509 A | 11/1996 |
| JP | 2009-017719 A | 1/2009 |
| JP | 2009-055733 A | 3/2009 |
| JP | 2010-011565 A | 1/2010 |
| JP | 2011-061940 A | 3/2011 |
| WO | 2007/060908 A1 | 5/2007 |

OTHER PUBLICATIONS

Translation of foreign document JP 2010011565 A (Year: 2010).*
Japanese Patent Office, International Search Report issued in Application No. PCT/JP2012/076796, mailed Jan. 15, 2013, 3 pp.
The State Intellectual Property Office of the People's Republic of China, Notice on the First Office Action issued in corresponding Chinese Patent Application No. 201280050661.4 and English-language translation mailed Sep. 24, 2015.
European Patent Office, Extended European Search Report issued in corresponding European Patent Application No. 12841273.1 dated Dec. 22, 2015.

* cited by examiner

ELECTRIC MOTOR AND METHOD FOR WINDING ELECTRIC MOTOR WINDING WIRE

TECHNICAL FIELD

The present invention relates to, for example, an electric motor mounted on a vehicle such as a car, and a method for winding a winding wire of the electric motor.

Priority is claimed on Japanese Patent Application No. 2011-228484, filed Oct. 18, 2011, the content of which is incorporated herein by reference.

BACKGROUND ART

Conventionally, an electric motor with a brush has been widely used as an electric motor mounted on vehicles such as cars. In this type of electric motor, a plurality of magnets are arranged at equal intervals in a circumferential direction on an inner circumferential surface of a cylindrical yoke, and an armature is rotatably supported on an inner side of these magnets. The armature has an armature core having a plurality of radially formed teeth. A plurality of axially long slots are formed between the respective teeth. A winding wire is wound between the slots having a predetermined interval, in, for example, a lap winding scheme.

A type of winding device including a flyer is known as a winding device used to wind a winding wire.

This type of winding device is configured to bring a winding wire from a nozzle provided in a tip of the flyer and wind the winding wire between predetermined slots.

A terminal portion of the winding wire is electrically connected to a commutator externally fitted to the rotating shaft to be adjacent to the armature core. The commutator is disposed in the circumferential direction in a state in which a plurality of segments which are metal pieces are insulated from each other. The terminal portion of the winding wire is connected to each of these segments. Among the plurality of segments, segments having the same electric potential are short-circuited by a connection wire.

Further, a plurality of brushes are slidably connected to each segment. A power is supplied to each winding wire through the brushes. Also, a magnetic field is formed in the powered winding wire, and the armature is driven by magnetically attractive and repulsive forces generated between the winding wire and the magnets of the yoke.

Here, in the winding wire wound between the predetermined slots, tension applied to the winding wire is often different depending on a used winding device, and rotation balance and weight balance of the armature vary due to the wound winding wire. Therefore, it is necessary to adjust the rotation balance or the weight balance of the armature. A method for attaching a modification material to the armature core or a method for cutting out a portion of the armature core is known as a method for adjusting the rotation balance or the weight balance of the armature.

Further, technology used to adjust rotation balance and weight balance of an armature by adjusting the number of turns of a winding wire wound between predetermined slots is disclosed (e.g., see Patent Literature 1).

Further, technology used to adjust rotation balance or weight balance of an armature by adjusting a winding place of a winding wire is disclosed (e.g., see Patent Literature 2).

CITATION LIST

Patent Literature

[Patent Literature 1] Japanese Examined Patent Application, Second Publication No. H7-34630

[Patent Literature 2] Japanese Unexamined Patent Application, First Publication No. 2009-55733

SUMMARY OF INVENTION

Problems to be Solved by the Invention

However, the number of operation steps increases if the modification material is attached to the armature core or a portion of the armature core is cut out in adjusting the rotation balance or the weight balance of the armature, as in the described related technology described above. Further, the number of parts of the modification material increases or a dedicated cutting tool is necessary. Therefore, the manufacturing cost increases.

Further, when the number of turns of the winding wire wound between the predetermined slots is adjusted or a winding place of the winding wire is adjusted as in Patent Literatures 1 and 2, magnetic balance is degraded due to, for example, a difference in the number of turns between the winding wire in each winding place.

The present invention has been made in view of the aforementioned circumstance, and an object of the present invention is to provide an electric motor and a method for winding a winding wire of the electric motor, which are capable of preventing increase in the manufacturing cost and improving rotation balance, weight balance and magnetic balance.

Means for Solving the Problem

According to a first aspect of the present invention, an electric motor includes a rotating shaft rotatably supported by a yoke; an armature core attached to the rotating shaft and including a plurality of teeth extending radially along a diameter direction and a plurality of slots formed between these teeth; a winding wire wound between the predetermined slots; and a commutator provided to be adjacent to the armature core in the rotating shaft and including a plurality of segments to which the winding wire are connected. When a predetermined number of turns of the winding wire between the predetermined slots is N, A is an integer equal to or more than 0, and $\alpha$ is set to satisfy $\alpha=0.5A$, the winding wire includes a first coil formed by being wound $N/2+\alpha$ times between the two predetermined slots present in positions which are point-symmetrical with respect to the rotating shaft, and a second coil formed by being wound $N/2-\alpha$ times between the two predetermined slots which are the same as those between which the first coil is formed.

According to the above configuration, the winding wire wound between the two predetermined slots present in the positions which are point-symmetrical with respect to the rotating shaft can be configured of the first coil and the second coil. In other words, the winding wire present in the positions which are point-symmetrical with respect to the rotating shaft are configured of the same coil. Therefore, a variation in tension between the winding wire present in the positions which are point-symmetrical with respect to the rotating shaft can be prevented. Therefore, it is possible to improve the rotation balance and weight balance of the entire armature. Thus, it is possible to improve the rotation balance and the weight balance of the armature without needing a modification material or a dedicated tool, unlike a case in related arts. As a result, it is possible to reduce manufacturing cost.

Further, it is not necessary to change the number of turns of the winding wire in each winding place, unlike a case in related arts. Therefore, it is possible to prevent deterioration of magnetic balance.

According to a second aspect of the present invention, in the electric motor according to the first aspect of the present invention, a winding start end and a winding termination end of the winding wire forming the first coil are connected to the respective predetermined segments, and a winding start end and a winding termination end of the winding wire forming the second coil are connected to the respective predetermined segments.

According to the above configuration, it is possible to reliably improve the rotation balance, the weight balance and the magnetic balance of the armature.

According to a third aspect of the present invention, in the electric motor according to the second aspect of the present invention, a crossover wire of the winding wire crossing between the two predetermined slots is wired in an axial end portion on the opposite side from the commutator of the armature core.

According to the above configuration, it is possible to reduce the number of winding wire wired between the commutator and the armature core. Therefore, it is possible to resolve winding expansion due to the winding wire between the commutator and the armature core and to achieve miniaturization of the entire armature.

According to a fourth aspect of the present invention, in the electric motor according to the second or third aspect of the present invention, the winding wire forming the first coil and the winding wire forming the second coil are separate winding wire.

According to the above configuration, it is possible to wind winding wire in a so-called double flyer scheme in which the winding wire are wound around two places at the same time in a relationship of point symmetry with respect to the rotating shaft. Therefore, efficiency of a winding task is improved.

A fifth aspect of the present invention is a method for winding a winding wire of an electric motor which includes: a rotating shaft rotatably supported by a yoke; an armature core attached to the rotating shaft and including a plurality of teeth extending radially along the diameter direction and a plurality of slots formed between these teeth; a winding wire wound between the predetermined slots; and a commutator provided in the rotating shaft to be adjacent to the armature core and including a plurality of segments to which the winding wire are connected, the method including: when a predetermined number of turns of the winding wire between the predetermined slots is N, A is an integer equal to or more than 0, and α is set to satisfy α=0.5A, forming a first coil by continuously winding the winding wire N/2+α times between the two predetermined slots present in positions which are point-symmetrical with respect to the rotating shaft, forming a second coil by continuously winding the winding wire N/2−α times between the two predetermined slots from on the first coil, and winding the first coil and the second coil at the same time.

According to the winding method for an electric motor, it is possible to provide an electric motor capable of preventing increase in a manufacturing cost and improving rotation balance, weight balance and magnetic balance.

Effects of the Invention

According to the invention described above, the winding wire wound between the two predetermined slots present in the positions which are point-symmetrical with respect to the rotating shaft can be configured of the first coil and the second coil. In other words, the winding wire present in the positions which are point-symmetrical with respect to the rotating shaft are configured of the same coil. Therefore, since a variation in tension between the winding wire present in the positions which are point-symmetrical with respect to the rotating shaft can be prevented, it is possible to improve rotation balance and weight balance of the entire armature. Thus, it is possible to improve the rotation balance and the weight balance of the armature without needing a modification material or a dedicated tool, unlike a conventional case. As a result, it is possible to reduce manufacturing cost.

Further, it is not necessary to change the number of turns of the winding wire in each winding place, unlike a conventional case. Therefore, it is possible to prevent a deterioration of magnetic balance.

DESCRIPTION OF EMBODIMENTS (Motor with a Reducer)

Next, embodiments of the present invention will be described with reference to the drawings.

Figure 1:
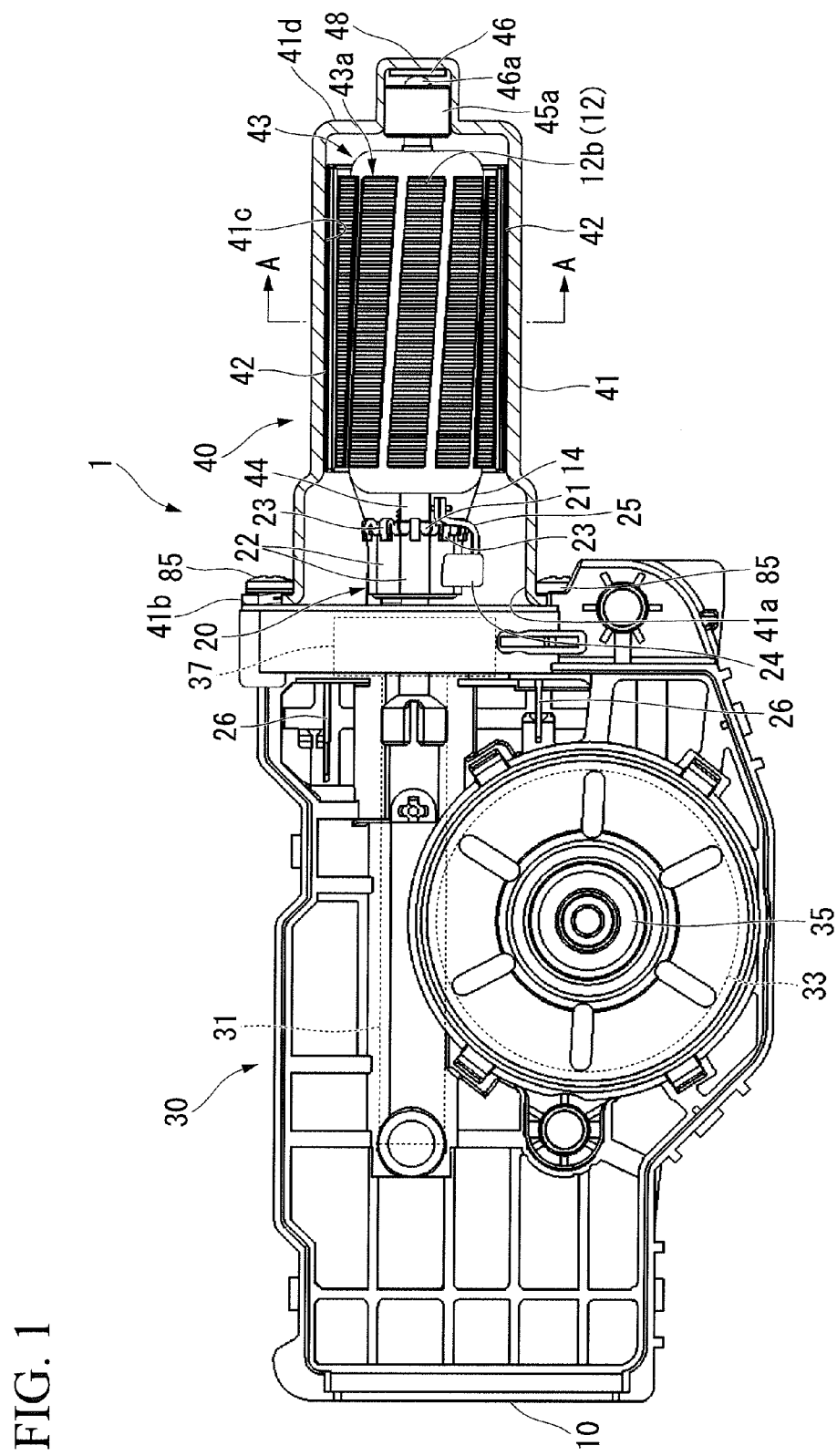
FIG. 1 is a partial cross-sectional view of a motor device with a reducer according to an embodiment of the present invention.
Figure 2:
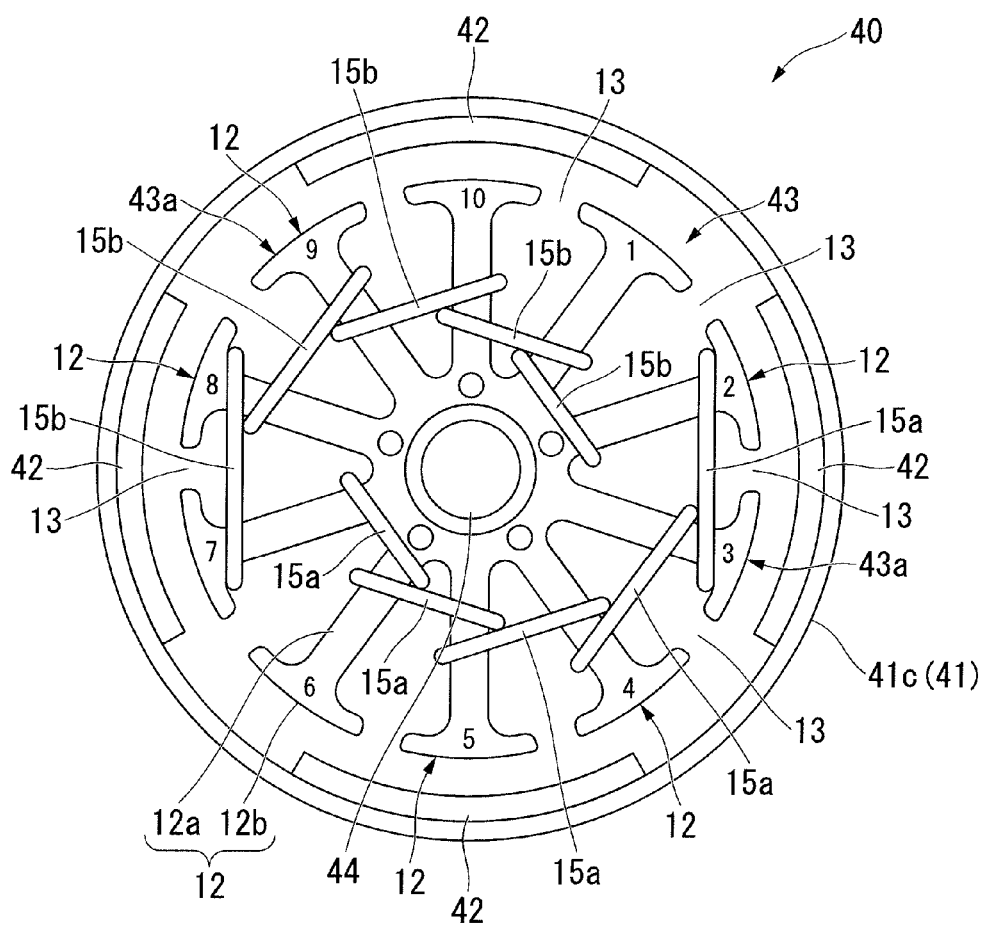
FIG. 2 is a cross-sectional view taken along a line A-A of FIG. 1.

FIG. 1 is a partial cross-sectional view of a motor device 1 with a reducer. FIG. 2 is a cross-sectional view taken along a line A-A of FIG. 1.

The motor device 1 with a reducer includes an electric motor 40, and a reduction mechanism 30 connected to the electric motor 40, as illustrated in FIGS. 1 and 2.

The reduction mechanism 30 is configured in such a manner that a worm 31 and a worm wheel 33 engaging with this worm 31 are received in the gear case 10. The worm wheel 33 is a member formed of a resin, a metal or the like, and is formed using injection molding, sintering, machining, or the like. An output gear 35 is connected to the worm wheel 33. The output gear 35 is provided in a state in which the output gear 35 is exposed to the outside of the gear case 10, and is connected to, for example, an opening and closing device for a glass window of a car.

Meanwhile, a rotating shaft 44 of the electric motor 40 is connected to one end of the worm 31 through a joint member 37 so that the rotating shaft 44 is not relatively rotatable. Accordingly, rotational force of the electric motor 40 is delivered to the output gear 35 through the worm 31 and the worm wheel 33.

(Electric Motor)

The electric motor 40 includes a yoke 41, and an armature 43 rotatably supported in an inner side of the yoke 41.

The yoke 41 is formed of a magnetic material such as iron and formed in a cylindrical shape having a bottom portion, for example, by performing deep drawing-based press processing or the like on a metal plate. The yoke 41 is attached so that its opening 41a is directed to the reduction mechanism 30. A flange portion 41b is formed in the periphery of the opening 41a of the yoke 41. Attachment holes, which are not illustrated, penetrating the flange portion 41b are formed in the flange portion 41b. The yoke 41 is fixed to the gear case 10 by inserting bolts 85 into the attachment holes of the flange portion 41b and fastening the bolts 85 to the gear case 10.

Four magnets 42 formed in a curved tile shape are provided in an inner circumferential surface of the cylindrical portion 41c of the yoke 41 so that their magnetic poles are alternately arranged at equal intervals along in a circumferential direction. The magnets 42 are affixed to the inner circumferential surface of the cylindrical portion 41c of the yoke 41 by an adhesive or the like.

A boss portion 48 projecting toward the opposite side of the reduction mechanism 30 is formed in the bottom portion 41d of the yoke 41. A sliding bearing 45a used to rotatably support one end of the rotating shaft 44 of the armature 43 is fitted in an inner side of the boss portion 48.

Further, a thrust plate 46 is provided on the bottom portion side of the boss portion 48 of the yoke 41. The thrust plate 46 receives a thrust load of the rotating shaft 44 through a steel ball 46a. The steel ball 46a is a member used to reduce sliding resistance between the rotating shaft 44 and the thrust plate 46 and absorbing misalignment of the rotating shaft 44 to reliably deliver the thrust load of the rotating shaft 44 to the thrust plate 46.

The armature 43 includes a rotating shaft 44, an armature core 43a externally fixed to the rotating shaft 44, and a commutator 20 arranged on the reduction mechanism 30 side relative to the armature core 43a.

The reduction mechanism 30 side of the rotating shaft 44 is rotatably supported by a sliding bearing 45b, which is not illustrated, that is provided in the gear case 10.

The armature core 43a is formed, for example, in such a manner that a magnetic material such as an electromagnetic steel plate is stacked and axially longer. The armature core 43a is arranged in a position corresponding to the magnet 42. Ten teeth 12 are radially formed in the armature core 43a to be at equal intervals in the circumferential direction.

Each tooth 12 includes a winding drum portion 12a extending toward an outer side in a diameter direction, and an outer peripheral portion 12b provided on a tip of the winding drum portion 12a and extending in the circumferential direction. In other words, the outer peripheral portion 12b provided on the tip of the tooth 12 configured to an outer peripheral surface of the armature core 43a and configured to face the magnet 42. Further, each tooth 12 is formed so that its extending direction is twisted with respect to an axial direction and has a predetermined skew angle.

Further, slots 13 are formed between the teeth 12 adjacent in the circumferential direction. A winding wire 14 is inserted between the predetermined slots 13 among these slots 13 and wound around the winding drum portions 12a of the teeth 12 via an insulator, which is not illustrated, that is an insulating material (details will be described below).

Each of a winding start end 14a and a winding termination end 14b of the winding wire 14 is connected to the commutator 20.

The commutator 20 includes a cylindrical body portion 21 externally fixed to the rotating shaft 44, and ten segments 22 arranged side by side in the circumferential direction on the outer peripheral surface of the body portion 21. Therefore, the electric motor 40 of this embodiment includes the four magnets 42, ten of the slots 13, and the ten segments 22, that is, has four poles, ten slots, and ten segments.

The body portion 21 of the commutator 20 is formed of a synthetic resin. The ten segments 22 are provided to be insulated from each other in the body portion 21. The segment 22 is formed of a metal piece having an axially long plate shape. An end on the armature core 43a side of the segment 22 is bent to wrap toward an outer diameter to form a riser 23. The winding start end 14a and the winding termination end 14b of the winding wire 14 are wound around this riser 23 and are fixed by fusing. Accordingly, the segment 22 and the winding wire 14 are electrically connected.

A pair of brushes 24 are provided in an outer periphery of the commutator 20. These brushes 24 are provided to advance or retreat toward the commutator 20 through a brush holder, which is not illustrated. Further, the brushes 24 come in sliding contact with the segments 22 in a state in which the brushes are biased toward the commutator 20 by a spring, which is not illustrated.

One end of a pigtail 25 is connected to a base end side of each brush 24. The other end of the pigtail 25 is connected to a connector terminal 26 provided in the gear case 10. The connector terminal 26 is provided in a projecting manner to be exposed from the gear case 10 to the outside and is configured to be connectable to a connector extending from an external power supply, which is not illustrated. Accordingly, an electric current is supplied to the winding wire 14 through the brush 24 and the commutator 20.

(Method for Winding a Winding Wire)

Next, a method for winding the winding wire 14 around the armature core 43a will be described with reference to FIG. 3.

Figure 3:
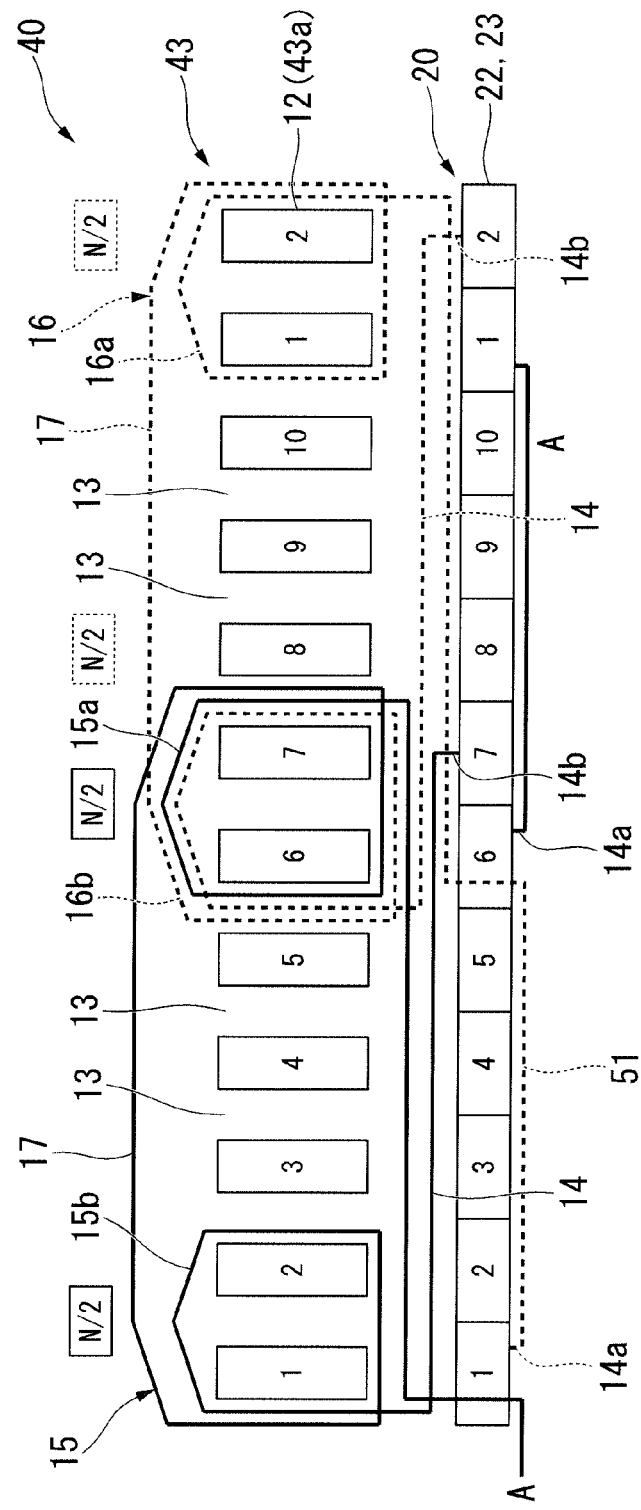
FIG. 3 is a development view of an armature according to the embodiment of the present invention.

FIG. 3 is a development view of the armature 43, and gaps between the adjacent teeth 12 are equivalent to the slots 13. Further, the respective teeth 12 and the respective segments 22 are denoted with reference numerals in the following description.

Here, the segments 22 which have the same electric potential, i.e., the segments 22 (e.g., the first segment 22 and the sixth segment 22) present in positions which are point-symmetrical with respect to the rotating shaft 44 are short-circuited by a connection wire 51 formed in the winding wire 14.

Further, the first coil 15 and the second coil 16 are formed in the armature core 43a by winding the winding wire 14 between two predetermined slots 13 present in every other position and between two other slots 13 present in positions which are point-symmetrical to these two slots 13 with respect to the rotating shaft 44 in a lap winding scheme.

More specifically, a method for forming the connection wire 51, the first coil 15 and the second coil 16 will be described. Further, the connection wire 51, the first coil 15 and the second coil 16 are formed using a type of winding device (not illustrated) including a flyer.

Here, a method for forming the connection wire 51 and the first coil 15 will be first described.

For example, the winding wire 14 whose winding start end 14a is wound around the riser 23 of the sixth segment 22 is first wound around the riser 23 of the first segment 22 which is a segment having the same electric potential as the sixth segment 22 to thereby form the connection wire 51, as illustrated in FIG. 3.

Subsequently, the winding wire 14 is wound between the slot 13 between the seventh and eighth teeth 12 and the slot 13 between the fifth and sixth teeth 12 in the reverse direction to form the small coil 15a (counterclockwise in FIG. 3). In other words, the small coil 15a is formed by winding the winding wire 14 in the reverse direction to extend over the sixth and seventh teeth 12.

Here, when a total number of turns of the winding wire 14 wound around the sixth and seventh teeth 12 is N (N is an integer), the number of turns of the small coil 15a is set to N/2.

Subsequently, the winding wire 14 is drawn out from the slot 13 between the seventh and eighth teeth 12 again. In this case, the winding wire 14 is drawn out toward an opposite side from the commutator 20 of the armature core 43a. Also, the winding wire 14 drawn out in this way is drawn into the slot 13 between the tenth and first teeth 12, and wound in the reverse direction between the slot 13 between the tenth and first teeth 12 and the slot 13 between the second and third teeth 12 to form the small coil 15b. In other words, the small coil 15b is formed by winding the winding wire 14 in the reverse direction to extend over the first and second teeth 12.

Here, the number of turns of the small coil 15b is also set to be the same as the number of turns of the small coil 15a. In other words, when the total number of turns of the winding wire 14 wound around the first and second teeth 12 is N, the number of turns of the small coil 15b is set to N/2.

Then, the winding wire 14 is drawn out from the slot 13 between the tenth and first teeth 12, and the winding termination end 14b of the winding wire 14 is wound around the riser 23 of the seventh segment 22 adjacent to the sixth segment 22. Accordingly, the first coil 15 including the two small coils 15a and 15b is formed between the sixth and seventh segments 22.

Here, the two small coils 15a and 15b are present in the positions which are point-symmetrical with respect to the rotating shaft 44. In other words, the two small coils 15a and 15b to which substantially the same tension is applied by one flyer (not illustrated) are present in the positions which are point-symmetrical with respect to the rotating shaft 44.

Further, the winding wire 14 forming the first small coil 15a is drawn out toward the opposite side from the commutator 20 of the armature core 43a and then drawn into the slot 13 between the tenth and first teeth 12 to form the second small coil 15b. Therefore, a crossover wire 17 of the winding wire 14 extending over the two small coils 15a and 15b is wired in an axial end portion on the opposite side from the commutator 20 of the armature core 43a.

Next, a method for forming the connection wire 51 and the second coil 16 will be described.

Here, a flyer different from the flyer, which is not illustrated, that forms the first coil 15 is used for the second coil 16. The second coil 16 is formed by operating the flyer, which is not illustrated, to be point-symmetrical to the first coil 15 with respect to the rotating shaft 44. In other words, a task for winding the winding wire 14 is performed by a so-called double flyer scheme in which the winding wire 14 is wound around two places at the same time in a relationship of point-symmetry of the places with respect to the rotating shaft 44.

Therefore, for example, when the winding start end 14a of the winding wire 14 forming the first coil 15 is wound around the riser 23 of the sixth segment 22, the winding start end 14a of the winding wire 14 forming the second coil 16 is wound around the riser 23 of the first segment 22 present in a position which is point-symmetrical to the sixth segment 22 with respect to the rotating shaft 44. Also, the winding wire 14 is then wound around the riser 23 of the sixth segment 22 to form the connection wire 51 (see the dashed line in FIG. 3).

Subsequently, the winding wire 14 is wound N/2 times in a reverse direction to extend over the first and second teeth 12 present in positions which are point-symmetrical to the sixth and seventh teeth 12 with respect to the rotating shaft 44 to form the small coil 16a. The winding wire 14 is then drawn out from the slot 13 between the second and third teeth 12 to an opposite side of the commutator 20. The winding wire 14 is then drawn into the slot 13 between the seventh and eighth teeth 12 and the crossover wire 17 is wired on the opposite side of the commutator 20 of the armature core 43a. The winding wire 14 is then wound N/2 times in the reverse direction to extend over the sixth and seventh teeth 12 to form the small coil 16b.

Subsequently, the winding termination end 14b of the winding wire 14 is wound around the riser 23 of the second segment 22 adjacent to the first segment 22. Accordingly, the second coil 16 including the two small coils 16a and 16b is formed between the first and second segments 22.

Here, the two small coils 16a and 16b are present in positions which are point-symmetrical with respect to the rotating shaft 44. In other words, the two small coils 16a and 16b to which substantially the same tension has been applied by one flyer (not illustrated) are present in positions which are point-symmetrical with respect to the rotating shaft 44.

Thus, the first coil 15 and the second coil 16 in which the small coils 15a to 16b present in positions which are point-symmetrical with respect to the rotating shaft 44 have substantially the same tension are wound around the first and second teeth 12 and the sixth and seventh teeth 12. Also, the winding wire 14 is wound around the first and second teeth 12 a total of N times by the two small coils 15b and 16a wound N/2 times. Further, the winding wire 14 is wound around the sixth and seventh teeth 12 a total of N times by the two small coils 15a and 16b wound N/2 times.

Also, the task of winding the winding wire 14 is completed by sequentially repeatedly forming the first coil 15 and the second coil 16 formed as described above while shifting the first coil 15 and the second coil 16 in the circumferential direction of the armature 43. In other words, for the first coil 15, the winding wire 14 is wound to extend over the first and second teeth 12 to form the small coil 15b and then is connected to the predetermined segment 22, and the winding wire 14 is wound to extend over the fifth and sixth teeth 12 located on an opposite side from the first and second teeth 12 across the rotating shaft 44 to form the small coil 15a. Also, the winding wire 14 is wound to extend over the second and third teeth 12 present in the positions which are point-symmetrical to the fifth and sixth teeth 12 with respect to the rotating shaft 44 to form the small coil 15b.

Thus, the winding task is performed while alternately moving the flyer, which is not illustrated, toward both sides across the rotating shaft 44 and shifting the flyer in the circumferential direction of the armature 43.

In the configuration described above, when an electric current is supplied to the winding wire 14 through a pair of brushes 24, a magnetic field is generated in the armature core 43a. Also, magnetically attractive and repulsive forces act between this magnetic field and the magnets 42 provided in the yoke 41 to rotate the armature 43. So-called rectification in which the segment 22 with which the brush 24 is in sliding contact is sequentially changed and a direction of the electric current flowing in the winding wire 14 is switched by this rotation is performed, and the armature 43 is continuously rotated.

Here, the first coil 15 wound around the armature core 43a includes the two small coils 15a and 15b present in positions which are point-symmetrical with respect to the rotating shaft 44 and to which substantially the same tension is applied. Further, the second coil 16 includes the two small coils 16a and 16b present in positions which are point-symmetrical with respect to the rotating shaft 44 and to which substantially the same tension is applied. Therefore, rotation balance and weight balance of the entire armature 43 are improved.

Further, if the double flyer scheme is adopted in winding the winding wire 14 around the armature core 43a, the tensions of the two coils present in the positions which are point-symmetrical with respect to the rotating shaft 44 are different when the coils present in the positions which are point-symmetrical with respect to the rotating shaft 44 are formed using separate flyers as in a conventional case.

In other words, for example, when the winding wire 14 is wound around the first and second teeth 12 N times using one flyer and the winding wire 14 is wound around the sixth and seventh teeth 12 N times using the other flyer in FIG. 3, the two coils present in positions which are point-symmetrical with respect to the rotating shaft 44 are formed by separate flyers and the tensions are different. In such a case, since the rotation balance and the weight balance of the entire armature 43 are degraded, it is necessary to adjust the rotation balance and the weight balance using a modification material or a dedicated tool.

On the other hand, according to the above-described embodiment, it is possible to improve the rotation balance or the weight balance of the armature 43 without needing a modification material or a dedicated tool, unlike a case in related arts. Therefore, it is possible to reduce manufacturing cost.

Further, it is possible to prevent deterioration of magnetic balance since it is not necessary to change the number of turns of the winding wire 14 in each winding place, unlike a case in related arts.

Further, since the winding wire 14 is wound around the armature core 43a in a double flyer scheme, efficiency of a winding task is improved.

Also, the crossover wire 17 wired between the two small coils 15a and 15b configuring the first coil 15 and the crossover wire 17 wired between the two small coils 16a and 16b configuring the second coil 16 are respectively located in axial end portions on the opposite side from the commutator 20 of the armature core 43a. Therefore, the number of the winding wire 14 wired between the commutator 20 and the armature core 43a can be reduced, and winding expansion by the winding wire 14 between the commutator 20 and the armature core 43a can be resolved. As a result, it is possible to achieve miniaturization of the entire armature 43.

Further, the present invention is not limited to the above-described embodiment, and includes various changes of the embodiment without departing from the scope of the present invention.

For example, the case in which the winding start end 14a of the winding wire 14 is first wound around the riser 23 of the sixth segment 22, the winding wire 14 is wound around the riser 23 of the first segment 22 which is a segment having the same electric potential as the sixth segment 22 to form the connection wire 51, the first coil 15 including the two small coils 15a and 15b is formed, and then the winding termination end 14b of the winding wire 14 is wound around the riser 23 of the seventh segment 22 adjacent to the sixth segment 22, in forming the first coil 15 including the two small coils 15a and 15b between the sixth and seventh segments 22, has been described in the embodiment.

FIRST MODIFIED EXAMPLE

Figure 4:
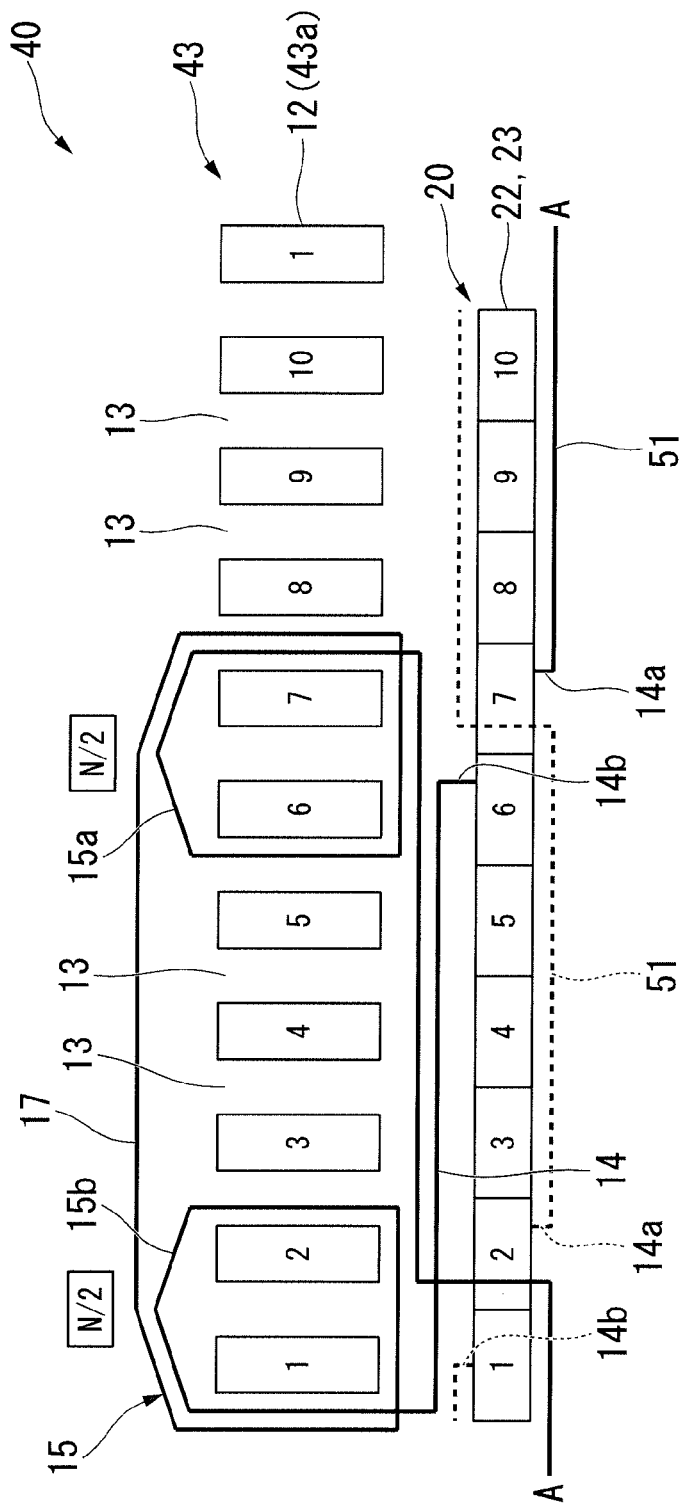
FIG. 4 is a development view of an armature according to a first modified example of the embodiment of the present invention.

However, the present invention is not limited thereto, and a method of first winding the winding start end 14a of the winding wire 14 around the riser 23 of the seventh segment 22, winding the winding wire 14 around the riser 23 of the second segment 22 which is a segment having the same electric potential as the seventh segment 22 to form the connection wire 51, forming the first coil 15 including the two small coils 15a and 15b, and then winding the winding termination end 14b of the winding wire 14 around the riser 23 of the sixth segment 22 adjacent to the seventh segment 22, in forming the first coil 15 including the two small coils 15a and 15b between the sixth and seventh segments 22, as illustrated in FIG. 4, may be used.

In this case, the winding wire 14 may be wound to be point-symmetrical with respect to the rotating shaft 44 in forming the second coil 16 in the same way of forming the first coil 15 (see a dashed line in FIG. 4).

SECOND MODIFIED EXAMPLE

Figure 5:
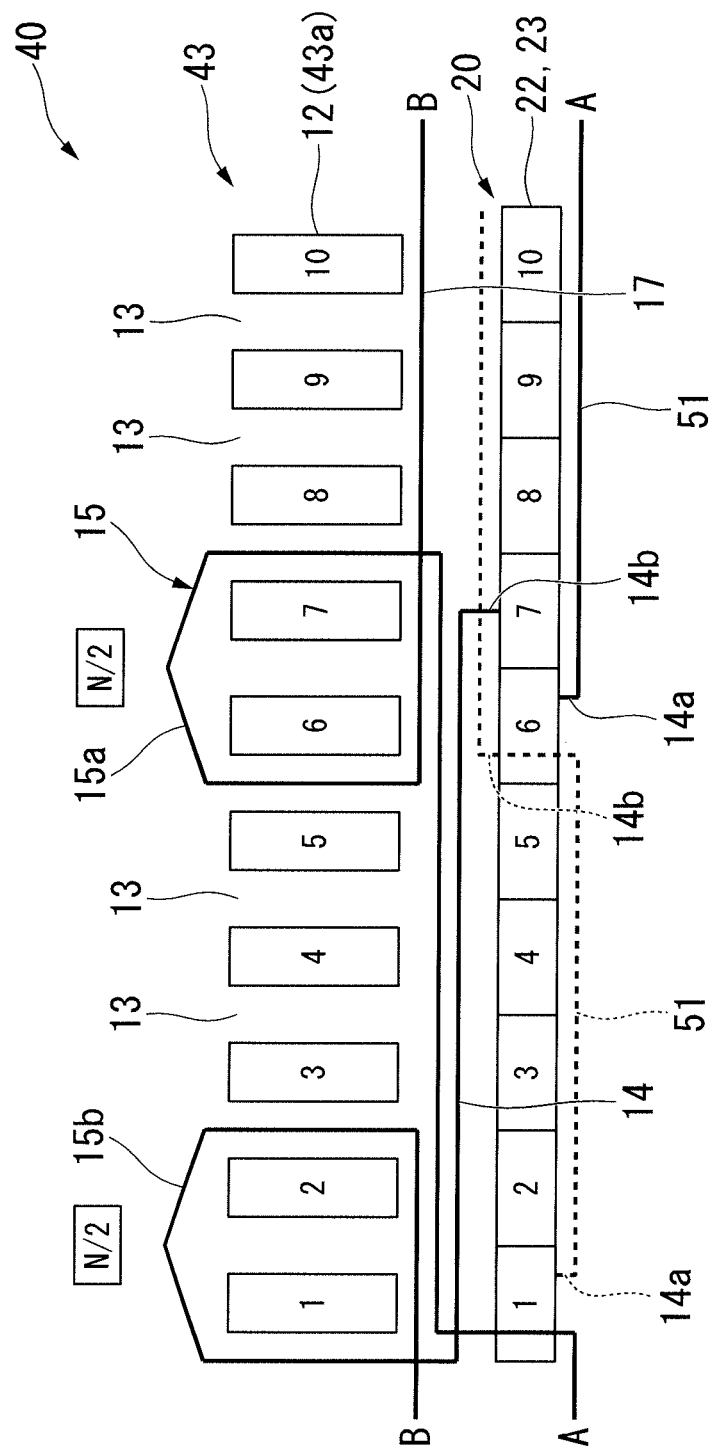
FIG. 5 is a development view of an armature according to a second modified example of the embodiment of the present invention.

Further, the case in which each of the crossover wire 17 wired between the two small coil 15a and 15b configuring the first coil 15 and the crossover wire 17 wired between the two small coils 16a and 16b configuring the second coil 16 is located in the axial end portion on the opposite side from the commutator 20 of the armature core 43a has been described in the above-described embodiment. However, the present invention is not limited thereto, and each crossover wire 17 may be located in the axial end portion on the commutator 20 side of the armature core 43a, as illustrated in FIG. 5.

Further, the case in which the number of turns of each of the small coils 15a, 15b, 16a and 16b is set to N/2 has been described in the above-described embodiment. However, the present invention is not limited thereto, and the number of turns of each of the small coils 15a, 15b, 16a and 16b may be set as follows.

THIRD MODIFIED EXAMPLE

Figure 6:
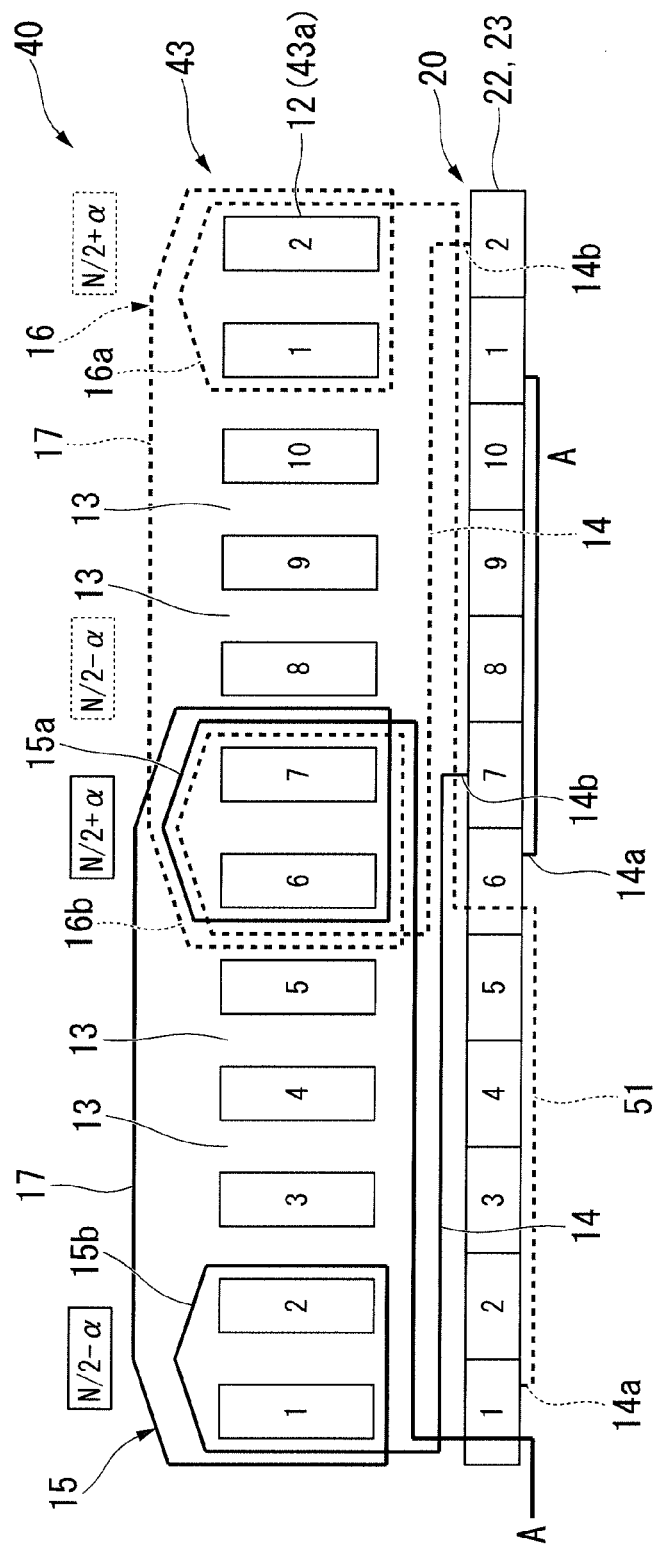
FIG. 6 is a development view of an armature according to a third modified example of the embodiment of the present invention.

FIG. 6 is a development view of the armature 43 according to a third modified example of the above-described embodiment.

When $\alpha$ is a number of increment of 0.5, such as 0.5, 1, 1.5, . . . , the number of turns of the small coil 15a among the two small coils 15a and 15b configuring the first coil 15 is set to $N/2+\alpha$, and the number of turns of the small coil 15b is set to $N/2-\alpha$, as illustrated in FIG. 6.

Further, the number of turns of the small coil 16b among the two small coils 16a and 16b configuring the second coil 16 is set to N/2−α, and the number of turns of the small coil 16a is set to N/2+α.

In this case, the first coil 15 and the second coil 16 wound around the armature core 43a are present in the positions which are point-symmetrical with respect to the rotating shaft 44 and are formed of the small coils 15a and 15b and the small coils 16a and 16b to which substantially the same tension is applied. Therefore, weight balance is slightly different between the small coils 15a and 15b and the small coils 16a and 16b. However, since the small coil 15a whose number of turns has been increased by +α and the small coil 16b whose number of turns has been decreased by −α supplement each other, the rotation balance and the weight balance are improved without changing a total number of turns of the entire armature 43. Further, the same applies to the small coil 15b and the small coil 16a. Thus, it is possible to improve versatility for adjustment, change or the like of an output characteristic of the motor device 1 with a reducer by increasing the number of turns by +α and decreasing the number of turns by −α.

Here, in the above-described embodiment, the number of turns of each of the small coils 15a, 15b, 16a and 16b is set to N/2 whereas, in the modified example, the number of turns of the small coil 15a is set to N/2+α, the number of turns of the small coil 15b is set to N/2−α, the number of turns of the small coil 16b is set to N/2−α, and the number of turns of the small coil 16a is set to N/2+α. Therefore, if the embodiment and the modified example are generalized and A is a natural number equal to or more than 0, α is set to satisfy $$\alpha = 0.5A$$

Further, the case in which the task for winding the winding wire 14 is performed while alternately moving the flyer, which is not illustrated, toward both sides across the rotating shaft 44 and shifting the flyer in the circumferential direction of the armature 43 and is completed by sequentially repeatedly forming the first coil 15 and the second coil 16 while shifting the first coil 15 and the second coil 16 in the circumferential direction of the armature 43 has been described in the above-described embodiment. However, the present invention is not limited thereto and the winding task may be performed in such a manner that the first coil 15 and the second coil 16 include the two small coils 15a to 16b such as the small coils 15a and 16a and the small coils 15b and 16b present in the positions which are point-symmetrical with respect to the rotating shaft 44, respectively. Hereinafter, this will be described in greater detail.

FOURTH MODIFIED EXAMPLE (Method for Winding a Winding Wire)

Figure 7:
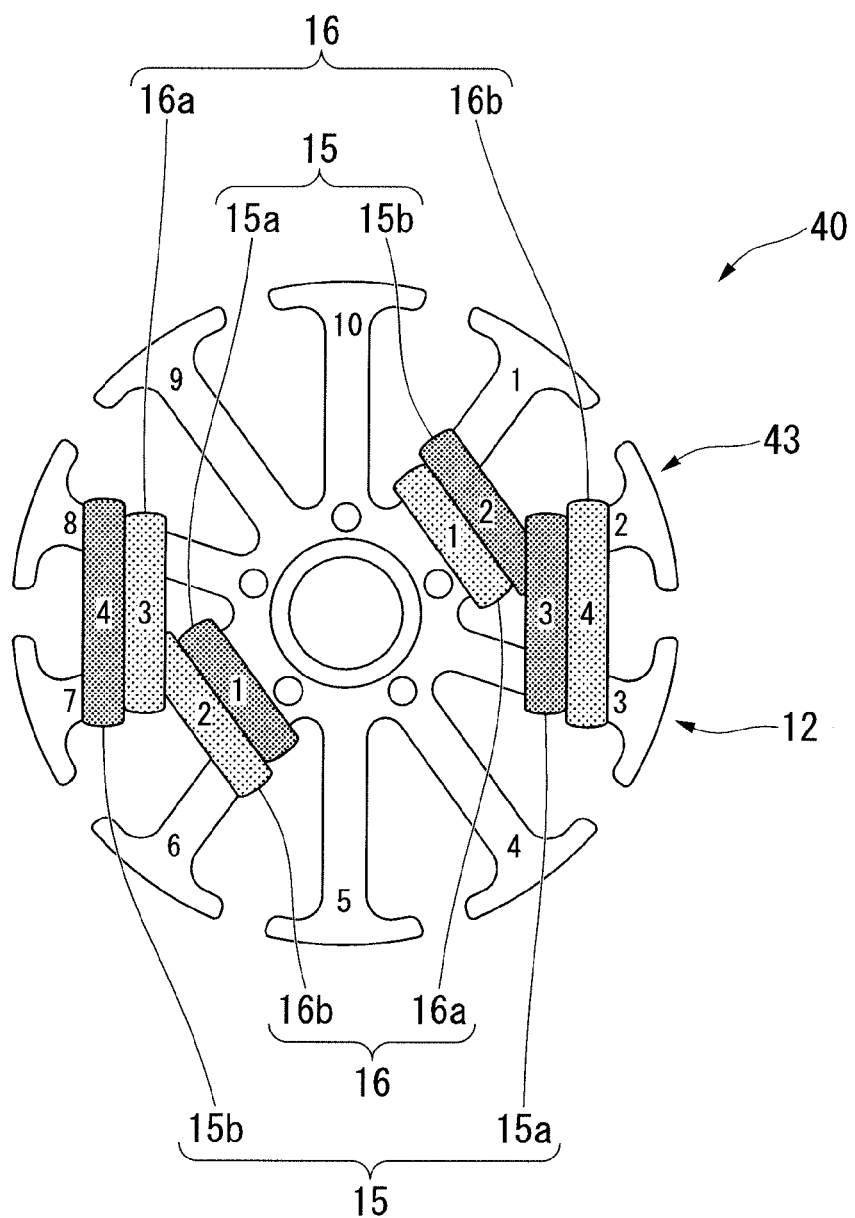
FIG. 7 is an illustrative view of a procedure of winding a winding wire according to a fourth modified example of the embodiment of the present invention.
Figure 8:
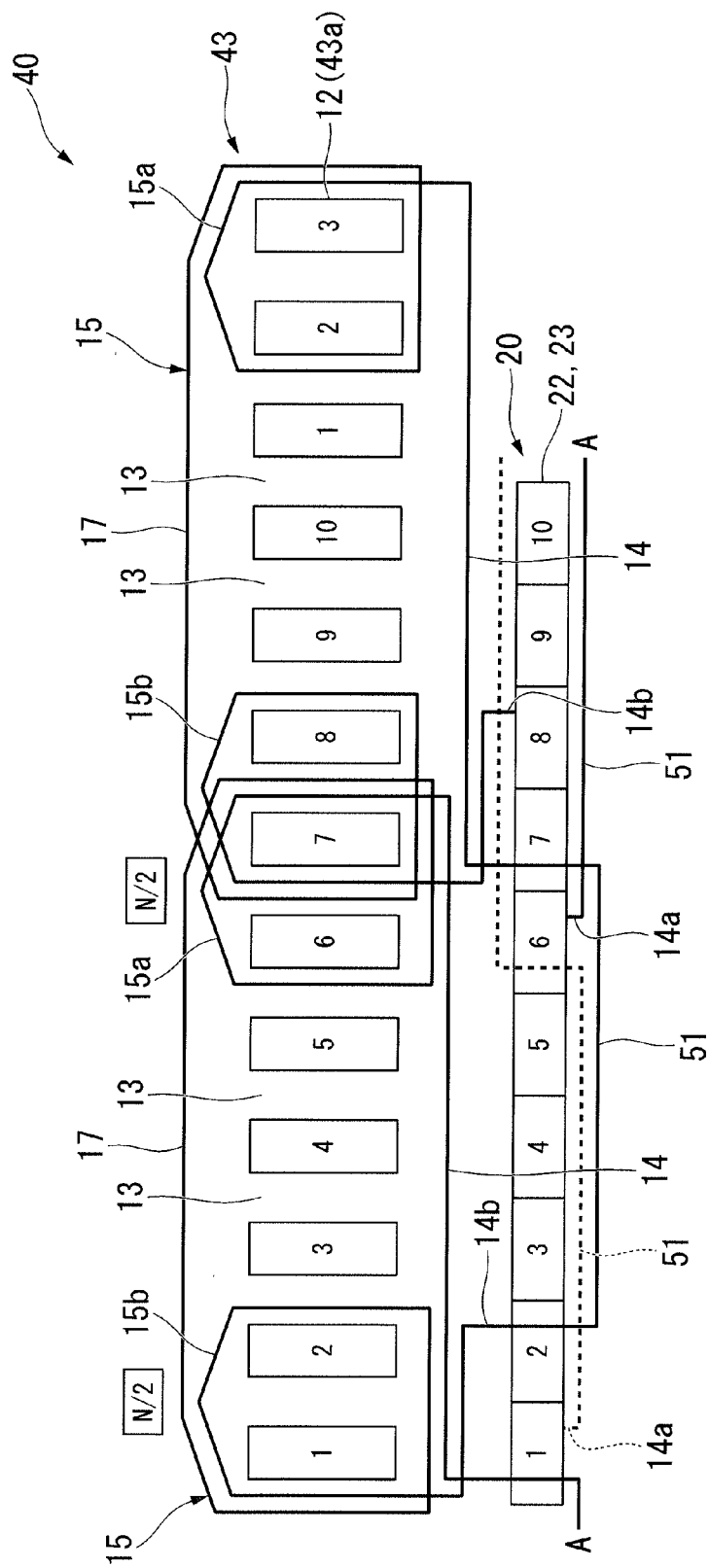
FIG. 8 is a development view of an armature according to a fourth modified example of the embodiment of the present invention.

FIG. 7 is an illustrative view of a procedure of winding the winding wire 14 in a fourth modified example of the above-described embodiment. FIG. 8 is a development view of the armature 43 in the fourth modified example of the embodiment.

Here, as illustrated in FIGS. 7 and 8, a procedure of forming the first coil 15 and a procedure of forming the second coil 16 have a relationship of point symmetry with respect to the rotating shaft 44, as in the above-described embodiment. Therefore, a description of the procedure of forming the second coil 16 is omitted in the following description, and only the procedure of forming the first coil 15 will be described (the same applies to the following modified examples).

Further, a procedure of winding the winding wire 14 to extend over the sixth and seventh teeth 12 to thereby form the small coil 15a and winding the winding wire 14 to extend over the first and second teeth 12 to thereby form the small coil 15b is similar to that in the above-described embodiment. Here, the winding termination end 14b of the winding wire 14 forming the small coil 15b is not wound around the riser 23 of the seventh segment 22, but is wound around the riser 23 of the second segment 22 adjacent to the first segment 22, unlike the above-described embodiment. Accordingly, the first coil 15 is formed.

Then, the winding wire 14 is wound around the riser 23 of the seventh segment 22 which is a segment having the same electric potential as the second segment 22 to form the connection wire 51. Subsequently, the winding wire 14 is wound N/2 times in the reverse direction to extend over the second and third teeth 12 rather than the seventh and eighth teeth 12 to thereby form the small coil 15a. In other words, the winding wire 14 wound around the riser 23 of the seventh segment 22 is drawn into the slot 13 between the third and fourth teeth 12, and is wound N/2 times in the reverse direction between the slot 13 between the third and fourth teeth 12 and the slot 13 between the first and second teeth 12 to form the small coil 15a.

Then, the winding wire 14 is drawn out from the slot 13 between the third and fourth teeth 12. In this case, the winding wire 14 is drawn out toward an opposite side (the upper side in FIG. 8) from the commutator 20 of the armature core 43a. Also, the winding wire 14 drawn out in this way is drawn into the slot 13 between the sixth and seventh teeth 12 and wound N/2 times in the reverse direction between the slot 13 between the sixth and seventh teeth 12 and the slot 13 between the eighth and ninth teeth 12 to form the small coil 15b. In other words, the small coil 15b is formed by winding the winding wire 14 N/2 times in the reverse direction to extend over the seventh and eighth teeth. Also, the crossover wire 17 crossing between the small coil 15a and the small coil 15b is formed on an opposite side from the commutator 20 of the armature core 43a.

The winding wire 14 is then drawn out from the slot 13 between the sixth and seventh teeth 12, and the winding termination end 14b of the winding wire 14 is wound around the riser 23 of the eighth segment 22 adjacent to the seventh segment 22. Accordingly, the first coil 15 including the two small coils 15a and 15b is formed between the seventh and eighth segments 22 again.

Further, the reference numerals 1 to 4 of the respective small coils 15a to 16b of FIG. 7 indicate the order in which the winding wire 14 is wound.

Here, the crossover wire 17 between these small coils 15b and 15a can be set to be shorter than that in the above-described embodiment by winding the winding wire 14 to extend over the first and second teeth 12 to form the small coil 15b, and then winding the winding wire 14 to extend over the second and third teeth 12 rather than the seventh and eighth teeth 12 to form the small coil 15a, unlike the above-described embodiment (see the small coil 15a having the reference numeral 3 in FIG. 7).

In other words, when the small coil 15a is formed in the seventh and eighth teeth 12 after the small coil 15b is formed in the first and second teeth 12, since the first and second teeth 12 and the seventh and eighth teeth 12 are present in the opposite positions with respect to the rotating shaft 44, the crossover wire 17 is correspondingly longer. However, when the small coil 15a is formed in the second and third teeth 12 after the small coil 15b is formed in the first and second teeth 12, since the first and second teeth 12 and the second and third teeth 12 are offset by one slot 13 in the circumferential direction, the crossover wire 17 can be set to be short. Therefore, it is possible to reduce the material cost of the winding wire 14.

FIFTH MODIFIED EXAMPLE

Figure 9:
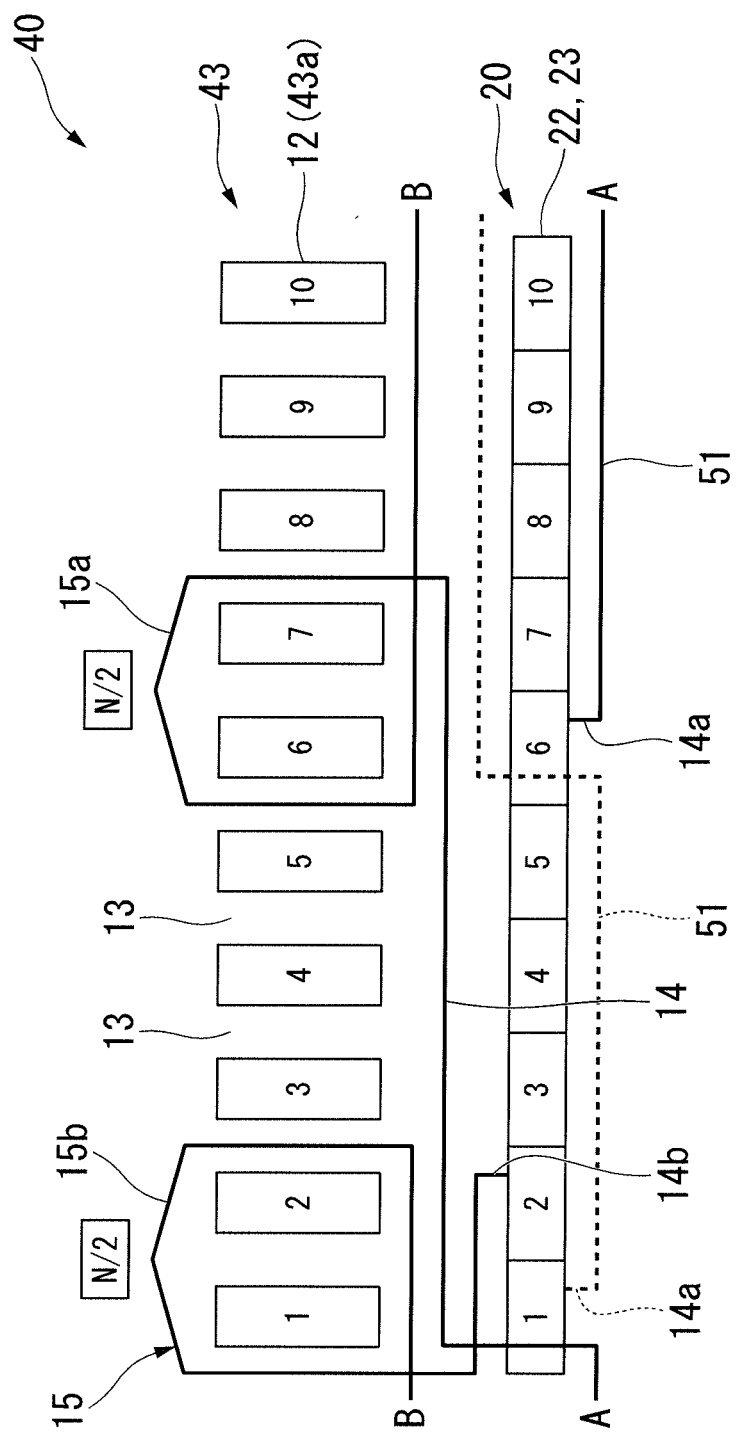
FIG. 9 is a development view of an armature according to a fifth modified example of the embodiment of the present invention.

Further, the case in which the crossover wire 17 crossing between the small coil 15a and the small coil 15b is formed on an opposite side from the commutator 20 of the armature core 43a has been described in the fourth modified example described above. However, the present invention is not limited thereto and each crossover wire 17 may be located in the axial end portion on the commutator 20 side of the armature core 43a, as illustrated in FIG. 9.

SIXTH MODIFIED EXAMPLE

Figure 10:
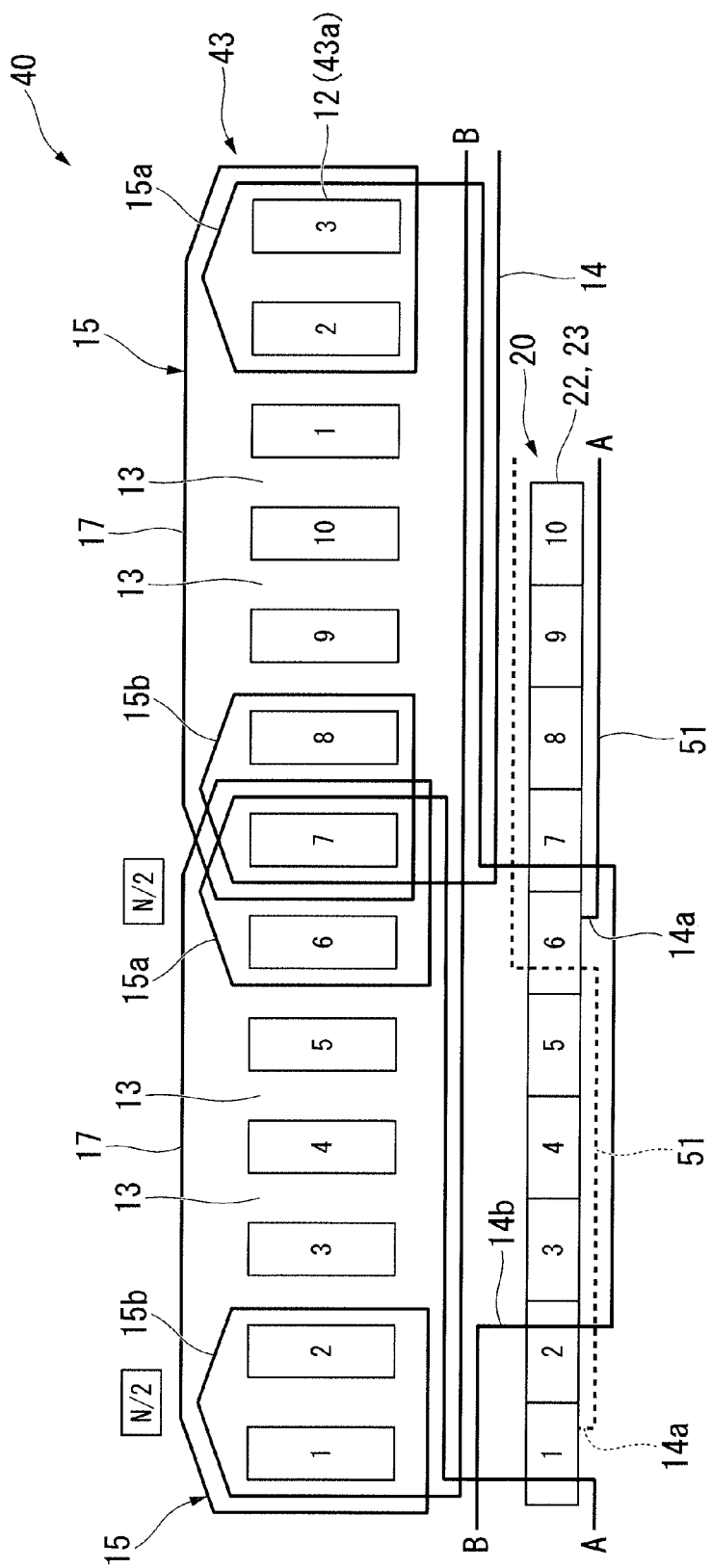
FIG. 10 is a development view of an armature according to a sixth modified example of the embodiment of the present invention.

Further, the case in which the small coil 15b is formed in the first and second teeth 12 and then the winding termination end 14b of the winding wire 14 is wound around the riser 23 of the second segment 22 has been described in the fourth modified example described above. Here, after the small coil 15b is formed, the winding wire 14 may be first wound around a portion corresponding to a portion between the commutator 20 and the armature core 43a in the rotating shaft 44, and then the winding termination end 14b may be wound around the riser 23 of the second segment 22 instead of being directly wound around the riser 23 of the second segment 22, as illustrated in FIG. 10.

With the above configuration, the winding wire 14 wired between the commutator 20 and the armature core 43a is brought close to the rotating shaft 44, such that winding expansion of the winding wire 14 wired between the commutator 20 and the armature core 43a can be resolved. In order to resolve this winding expansion more effectively, it is desirable for the entire winding termination end 14b of the sequentially formed small coil 15b to be first wound around the portion corresponding to the portion between the commutator 20 and the armature core 43a in the rotating shaft 44.

SEVENTH MODIFIED EXAMPLE

Figure 11:
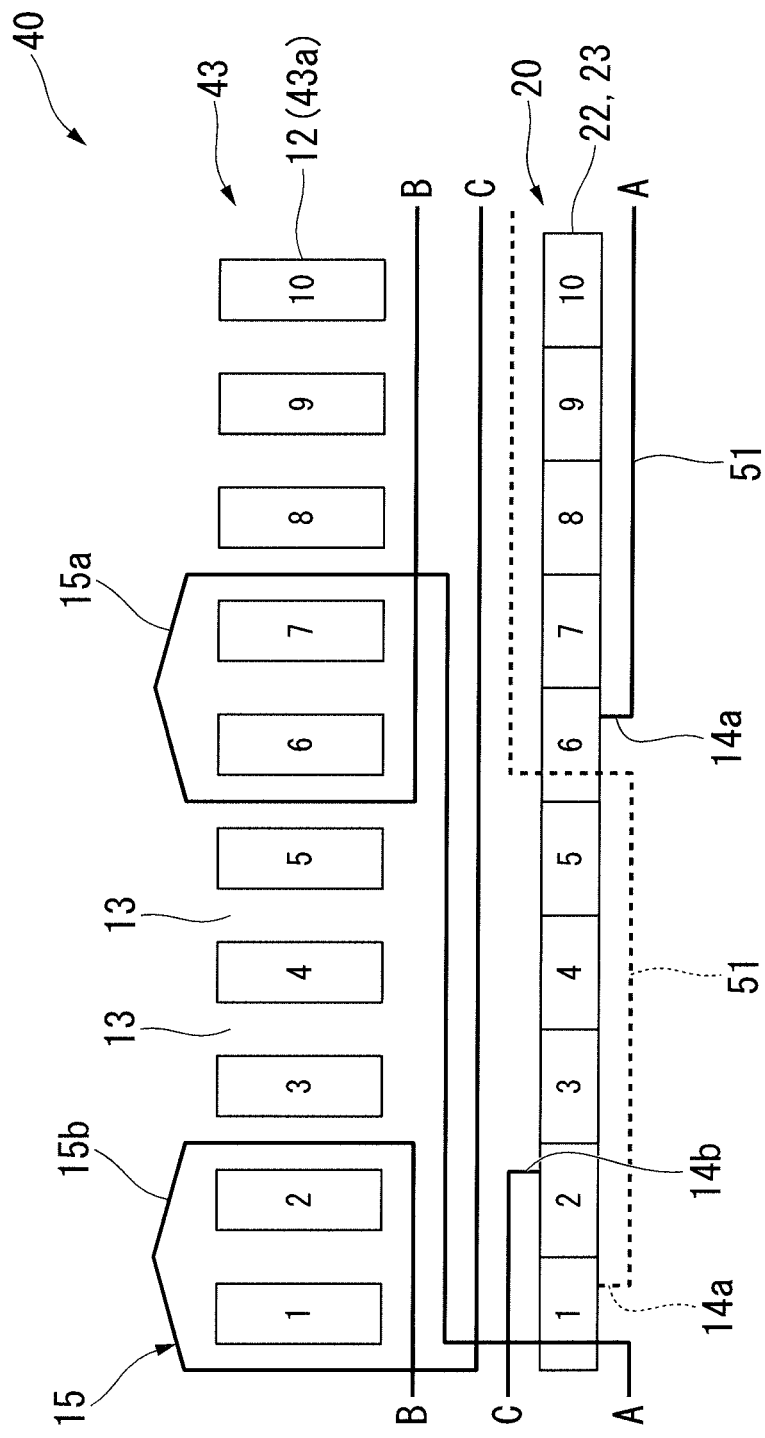
FIG. 11 is a development view of an armature according to a seventh modified example of the embodiment of the present invention.

Further, the configuration of the sixth modified example may be applied to the fifth modified example described above, as illustrated in FIG. 11. In other words, the case in which the small coil 15b is formed in the first and second teeth 12 and then the winding termination end 14b of the winding wire 14 is wound around the riser 23 of the second segment 22 has been described in the fifth modified example. However, after the small coil 15b is formed, the winding wire 14 may be first wound around the portion corresponding to the portion between the commutator 20 and the armature core 43a in the rotating shaft 44, and then the winding termination end 14b may be wound around the riser 23 of the second segment 22, instead of being directly wound around the riser 23 of the second segment 22.

INDUSTRIAL APPLICABILITY

According to the invention described above, the winding wire wound between the two predetermined slots present in the positions which are point-symmetrical with respect to the rotating shaft can be configured of the first coil and second coil. In other words, the winding wire present in the positions which are point-symmetrical with respect to the rotating shaft are configured of the same coil. Therefore, it is possible to improve the rotation balance and the weight balance of the entire armature since a variation in tension between the winding wire present in the positions which are point-symmetrical with respect to the rotating shaft can be prevented. Thus, it is possible to improve the rotation balance or the weight balance of the armature without needing a modification material or a dedicated tool, unlike a conventional case. As a result, it is possible to reduce manufacturing cost.

Further, it is not necessary to change the number of turns of the winding wire in each winding place, unlike a case in related arts. Therefore, it is possible to prevent deterioration of the magnetic balance.

REFERENCE SIGNS LIST 1 motor device with reducer
12 tooth
13 slot
14 winding wire
14a winding start end
14b winding termination end
15 first coil
16 second coil
17 crossover wire
20 commutator
22 segment
40 electric motor
41 yoke
43 armature
43a armature core

The invention claimed is:
1. An electric motor comprising:
a rotating shaft rotatably supported by a yoke;
an armature core attached to the rotating shaft and including a plurality of teeth extending radially to be in a diameter direction and a plurality of slots formed between these teeth;
a winding wire wound between the slots; and
a commutator adjacent to the armature core in the rotating shaft and including a plurality of segments to which the winding wire is connected,
wherein, when a predetermined number of turns of the winding wire between the slots is N, A is an integer equal to or more than 0, and $\alpha$ is set to satisfy $\alpha = 0.5$ A,
the winding wire includes a first coil including a first small coil and a second small coil, and a second coil including a third small coil and a fourth small coil,
the first small coil is formed by the winding wire being wound $N/2 + \alpha$ times between two predetermined slots,
the second small coil is formed by the winding wire being wound $N/2 - \alpha$ times between two other slots present in positions which are point-symmetrical to the two predetermined slots with respect to the rotating shaft,
the third small coil is formed by the winding wire being wound $N/2 + \alpha$ times between the two other slots which are the same as those between which the second small coil is formed, and
the fourth small coil is formed by the winding wire being wound $N/2 - \alpha$ times between the two predetermined slots which are the same as those between which the first small coil is formed.

2. The electric motor according to claim 1, wherein:
a winding start end and a winding termination end of the winding wire forming the first coil are connected to respective predetermined segments, and
a winding start end and a winding termination end of the winding wire forming the second coil are connected to the respective predetermined segments.

3. The electric motor according to claim 2, wherein a crossover wire of the winding wire crossing between the two predetermined slots is wired in an axial end portion on the opposite side from the commutator of the armature core.

4. The electric motor according to claim 2 or 3, wherein the winding wire forming the first coil and the winding wire forming the second coil are separate winding wires.

5. A method for winding a winding wire of an electric motor which comprises:
a rotating shaft rotatably supported by a yoke;
an armature core attached to the rotating shaft and including a plurality of teeth extending radially to be in a diameter direction and a plurality of slots formed between these teeth;
a winding wire wound between the slots; and
a commutator adjacent to the armature core in the rotating shaft and including a plurality of segments to which the winding wire is connected,
the method comprising:
when a predetermined number of turns of the winding wire between the slots is N, A is an integer equal to or more than 0, and $\alpha$ is set to satisfy $\alpha=0.5$ A,
forming a first coil including a first small coil and a second small coil, and a second coil including a third small coil and a fourth small coil,
forming the first small coil by continuously winding the winding wire $N/2+\alpha$ times between two predetermined slots,
forming the second small coil by continuously winding the winding wire $N/2-\alpha$ times between two other slots present in positions which are point-symmetrical with respect to the rotating shaft,
forming the third small coil by continuously winding the winding wire $N/2+\alpha$ times between the two other slots which are the same as those between which the second small coil is formed,
forming the fourth small coil by continuously winding the winding wire $N/2-\alpha$ times between the two predetermined slots from on the first small coil, and
winding the first coil and the second coil at the same time.

6. The method of claim 5 wherein the first coil is wound using a first flyer that produces a first tension, and the second coil is wound using a second flyer that produces a second tension.

* * * * *